Nov. 13, 1956    W. N. PARKER    2,770,778
SLOT COUPLING FOR TANGENT CIRCULAR WAVEGUIDE STRUCTURES
Filed April 27, 1951    2 Sheets-Sheet 1
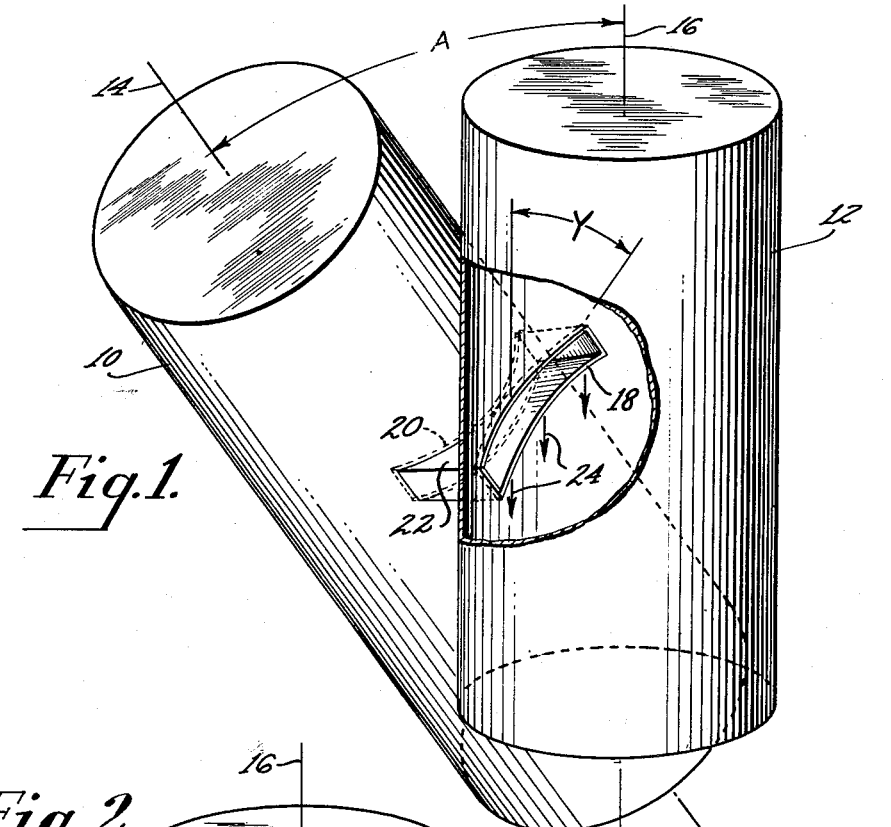
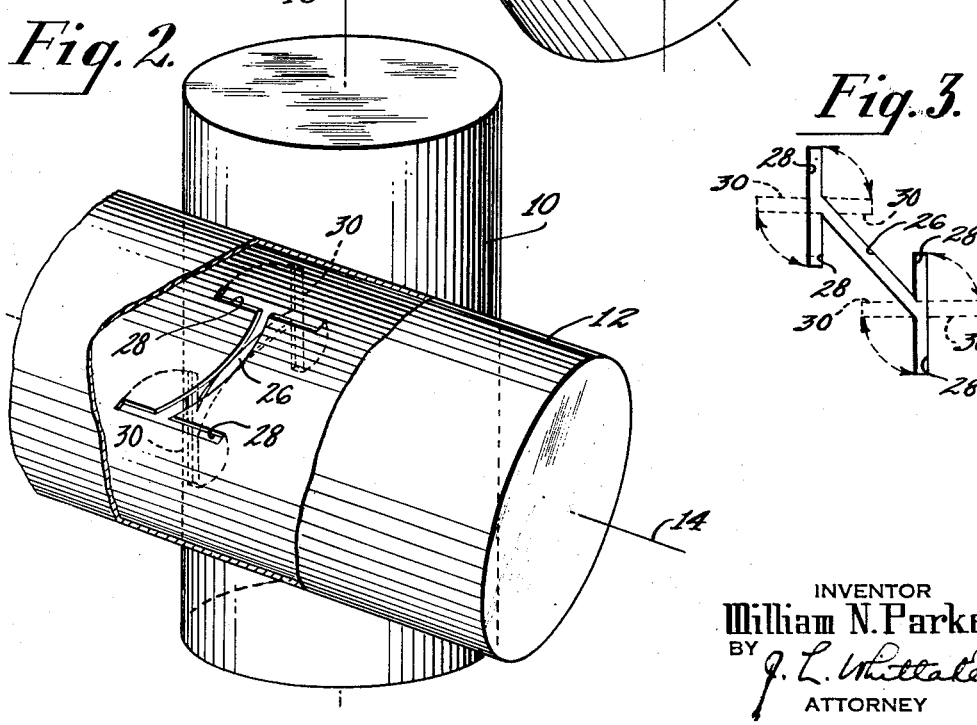
INVENTOR
William N. Parker
BY
ATTORNEY Nov. 13, 1956 W. N. PARKER 2,770,778
SLOT COUPLING FOR TANGENT CIRCULAR WAVEGUIDE STRUCTURES
Filed April 27, 1951 2 Sheets-Sheet 2
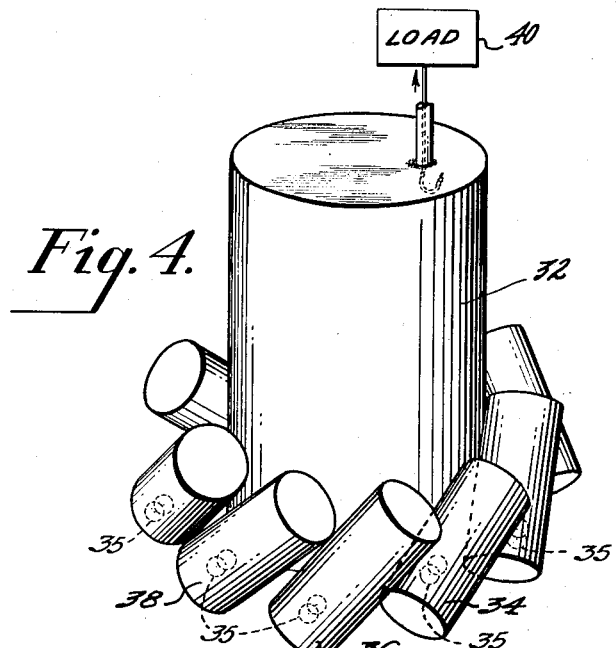
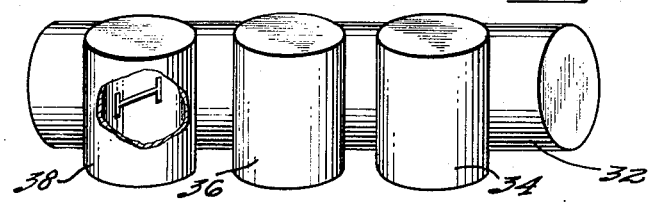
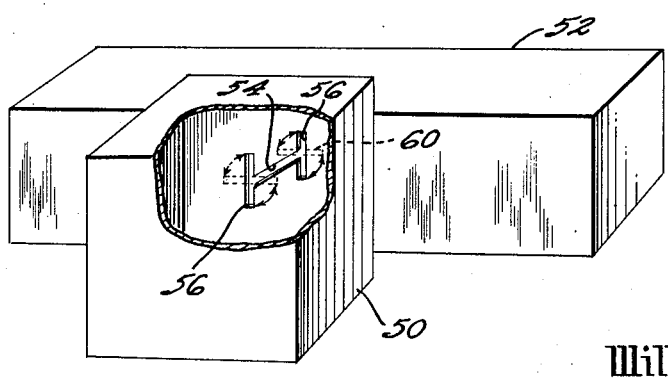
INVENTOR
William N. Parker
BY
ATTORNEY

United States Patent Office 2,770,778
Patented Nov. 13, 1956

2,770,778

SLOT COUPLING FOR TANGENT CIRCULAR WAVEGUIDE STRUCTURES

William N. Parker, Lancaster, Pa., assignor to Radio Corporation of America, a corporation of Delaware Application April 27, 1951, Serial No. 223,325

32 Claims. (Cl. 333—6)

The present invention is related to high frequency electromagnetic energy waveguiding structures and more particularly, although not exclusively, to cavity resonators.

It is frequently desirable to couple waveguiding structures and also to couple cavity resonators for various purposes. Among these purposes may be to secure a double resonance between coupled cavity resonators to give the effect of two cascaded resonant circuits; to assist in the frequency control of waves generated in one cavity resonator by the coupling to this resonator of another cavity resonator; transfer large amounts of high frequency power from one cavity to another; and various other purposes which may be apparent to those skilled in the art. It is frequently desirable to keep these cavity resonator structures including the coupling in a compact space and to nevertheless maintain a selected degree of coupling and a selected degree of an effective step-down or step-up ratio of energy flow between the resonators.

Among the objects of the invention are to provide a novel coupling arrangement between cavity resonators and more generally between waveguiding structures; to select a desired degree of coupling between cavity resonators in a novel way; to improve coupling arrangements between cavity resonators; to provide a coupling between cavity resonators having a desired transformation value; and to provide a cavity resonator coupling arrangement which is especially suited, bearing the foregoing objects in mind, for the coupling of high power cylindrical resonators.

These and other objects, advantages, and novel features of the invention will be more apparent from the following description when taken in connection with the accompanying drawing in which like reference numerals refer to like parts and in which:

Fig. 1 is a perspective view of a pair of circularly cylindrical resonators with the axis of one inclined at an acute angle to the axis of the other, coupled according to the invention;

Fig. 2 is an isometric view of another embodiment of the invention in which two circularly cylindrical cavity resonators having axes normal to each other are coupled according to the invention;

Fig. 3 is an enlarged isometric view of a portion of the coupling arrangement shown in Fig. 2;

Fig. 4 is an isometric view of another embodiment of the invention in which a plurality of resonators are coupled and disposed circumferentially about and to a single circularly cylindrical cavity resonator in accordance with the invention;

Fig. 5 is an isometric view of still another embodiment of the invention in which a plurality of resonators are disposed along a line parallel to the axis of a circularly cylindrical cavity resonator and coupled thereto; and Fig. 6 is an isometric view of still another embodiment of the invention in which rectangular resonators are coupled.

According to the invention, the two waveguiding structures are adapted for excitation in a known mode at an operating frequency. The walls of the waveguiding structures are arranged to be tangential at a point where the directions of current flow on the respective walls are non-parallel or inclined to each other. The walls of each structure have at the point of tangency an elongated slot parallel to a similar slot in the other wall through the point of tangency. The long dimension or length of the slots is inclined at an angle to the direction of current flow in each of the said walls. The coupling between the waveguiding structures is arranged to include these slots as by a metallic walled passageway through which one waveguiding space communicates with the other. An important feature of the invention is the use of slits at the ends of the slots. The slits aid in the effectiveness of the coupling.

In the preferred form of the invention in which cavity resonators are coupled, the resonators are arranged tangentially with the wall current flow of one resonator being inclined to the direction of that in the other at the point of tangency. Elongated slots are provided in the cavity walls for coupling. Each slot terminates one end of a passageway which affords communication between the resonant spaces defined by the resonator walls to be coupled. The passageway walls in the preferred form may be described as substantially plane or cylindrical with a directrix normal to the plane of tangency and with a generator line tracing the edges of the slots.

It has been found that the coupling of the invention is especially suitable for cavities excited in a mode which, undistorted by the coupling, has zero electric vector field strength at the wall coupling point, and more particularly for circularly cylindrical cavities excited in the $TM_{010}$ mode in which the cylindrical wall currents are all axial and there are no circumferential cylindrical wall currents. It is possible to secure by the arrangement of the invention with circular cylindrical cavity resonators a selection within a wide range of what may loosely be termed the effective transformer ratio of coupling by suitably choosing the angle of inclination between the cylinder axes and the angle of inclination of the parallel slots.

Referring now more particularly to Fig. 1, a circularly cylindrical cavity resonator 10 and a circularly cylindrical cavity resonator 12 are arranged with their respective axes 14, 16 inclined at an angle A. The resonators are placed substantially tangentially. When referring to the geometrical form of the cavity resonator, it will be understood that reference is made to the geometry of the resonant space. The walls of the resonator are significant only to a small fraction of a wavelength because the high frequency waves do not penetrate more than a few thousands of an inch. Therefore, when reference is made to the resonators as being tangential, it will be understood that the thickness of the walls may separate the resonant spaces which thickness being only a matter of a small fraction of a wavelength, it is still convenient to speak of the resonators as being arranged tangentially. An elongated slot 18 is cut in the circularly cylindrical wall of resonator 12. The slot 18 passes substantially through the point of tangency of the resonators. A similar slot 20 is cut in the circularly cylindrical walls of resonator 10 through the point of tangency. The slots 18 and 20 are substantially coplanar, and as preferred, coplanar in a plane which is normal to the common plane of tangency. In other words, each slot defines a central longitudinal curved line midway between the slot edges, and these lines lie in the same plane. Both of the resonators 10, 12 are to be excited in the $TM_{010}$ mode. Means of excitation are not shown, but such means are well-known to the art. The mode excited may be the dominant mode because of the proportions of the resonator with respect to the applied frequency. Energy may be applied to one of the resonators from a generator and withdrawn from the other resonator. Several types of generators utilizing an electron discharge device are described in U. S. Patent 2,471,037, issued to R. R. Law. Metallic walls 22 define a closed passageway between the slots 18 and 20, the passageway terminating at each of the slots. The passageway is internally substantially plane or cylindrical in the broad sense of the term. That is, the cylindrical or plane surface may be considered as generated by a line moving parallel to another line as directrix. In this instance, the directrix may be considered any line normal to the plane of tangency and the generating line follows a path parallel to the directrix and simultaneously intersecting the edges of the slots 18, 20. This construction is chosen because such a plane or cylindrical passageway with its walls normal to the plane of tangency affords practically the shortest path between the two cylinders. This short broad current path provides an efficient means of power transfer suitable for relatively large amounts of high frequency power. In most instances the slots 18 and 20 may be considered as substantially single slot in a common wall portion. The passageway walls may then be considered merely as a local thickening of the walls of the resonators toward the ends of slots 18 and 20. The common plane of the slots is normal to the axis 14 of resonator 10 in the example shown but is inclined at an angle to the axis 16 of resonator 12. The wall currents in the $TM_{010}$ in resonator 12 are typified by the arrows 24 and are axial, that is, parallel to the axis 16. The wall currents in resonator 10 are also axial and parallel to the axis 14.

In operation, wall currents intercepted by the slot in one resonator excite similar currents in the other resonator wall. In general, it may be assumed for purposes of rough analysis that the current density transversely across the slot will be equal for each of the two resonators. If the angle of the slot (not shown) with the axis 14 of resonator 10 is X and the angle of the slot 18 with the axis 16 of cavity resonator 12 is Y and if $I_1$ is the density of axial wall current at the slot in resonator 10 and $I_2$ is the axial density of the wall current at the slot 18 in resonator 12, then for the transverse slot current density I, $I=I_1 \sin X=I_2 \sin Y$. If the angle A (angle A is X plus Y) is 90°, and X or Y is 90°, then the ratio of the axial current densities is theoretically infinite, but due to resistive losses is only a maximum or minimum. The two wall currents are equal for the angle A equal 90° and $X=Y=45°$. By suitable choice of the angles the axial currents of the respective resonators may be given various other ratios. Thus a transformer effect is secured in which the current is stepped up or down from one cavity to the other.

The $TM_{010}$ mode in the cylindrical cavity is preferred because at the portion of the wall wherein the common slot is located, the resonator fields in each resonator, considered as undistorted by the slot itself, has a zero or vanishing electric field vector. Therefore, this mode, and other modes similarly characterized, when coupled in the two cavities, gives a coupling which may be considered, by analogy to low frequency lumped constant couplings, as purely inductive in nature, rather than capacitive. The effects of transformer coupling, with step-up or step-down current are readily attained. Capacity coupling effects if any are the result only of the field distortions arising from introduction of the slot. Further, the effects of the coupling are for these reasons readily calculated as indicated above. The comparative currents induced in one resonator by currents in the other are computed without the necessity for consideration of electric field coupling. Of course, such calculations are approximate and for preliminary purposes only. Notwithstanding, such preliminary trial calculations are helpful and assist in choosing parameters for trial purposes which are closer to giving the desired result than is otherwise possible, and sometimes make further trial unnecessary.

Another embodiment illustrated in Figs. 2 and 3 has the cavity resonators 10, 12 disposed with their axes at 90°. Resonator 12 has an elongated slot 26 through the point of tangency as before which is joined with a similar wall slot in substantially the same plane (not shown) in resonator 10. At the ends of slot 26 are elongated slits 28 which extend axially a distance several times the narrow dimension of slot 26. These longitudinal slits 28 are very narrow and substantially parallel to the direction of wall current flow and therefore interfere little with the field distribution or transfer of energy. They do, however, enhance the coupling effect of the slots by causing the coupling slots such as 26 to appear more nearly open-circuited at their ends, thereby effectively increasing their length and giving a greater coupling per slot length. Slot 26 and slits 28 thus form a wall opening in the form of a distorted letter H. Similar slits 30 are cut in the walls of resonator 10. Corresponding slits 28 and 30 are preferably connected by narrow twisted tubular passages of conducting material to prevent stray radiation. In this example, the resonators 10, 12 have their axes oriented normally to each other. The passageway between the slots 26 and its similar slot in the wall of resonator 12 is still substantially plane or cylindrical, although it communicates at its sides with the narrow twisted passageways between the slits 28, 30.

Referring now more particularly to Fig. 4, there is illustrated a main cavity resonator 32 circularly cylindrical in form and coupled thereto a plurality of other circularly cylindrical auxiliary resonators 34, circumferentially arranged around the main one. Each of the auxiliary resonators 34 has its axis inclined at an angle with respect to the axis of main resonator 32 to permit a compact assembly, and each is tangential to main resonator 32. Thus main resonator 32 is nested among the auxiliary resonators 34. Each of these auxiliary resonators 34 may be coupled by a coupling as illustrated in Fig. 1 or in Fig. 2. In the embodiment of Fig. 4, the arrangement of the invention is particularly useful since each of the auxiliary resonators as 34 may have a generator schematically indicated at 35 within it for generating the same or substantially the same high frequency energy as in each other auxiliary resonator. This energy is coupled by the slots into the resonator 32. Generator resonators as 34, are thus coupled to a much higher impedance but may be matched through the use of the slots. The slot coupling functions effectively as a transformer. The coupling between auxiliary resonators 34 through main resonator 32 may be sufficiently strong to keep them locked in step at the same frequency of energy generated in each auxiliary resonator. For a given density of wall current in each of the generator resonators indicating a particular amount of power generated therein, the total current developed in resonator 32 is much greater than in any one of the single generators and yet they may be all well matched. In effect, the generator resonators are coupled in parallel with the resonator 32 to which a suitable load 40 may be coupled by any conventional method.

Fig. 5 shows a coupling arrangement according to the invention between the main cavity resonator 32 and auxiliary resonators 34, 36, 38 in which the auxiliary resonators are disposed along a line parallel to the main resonator axis. The operation is similar to that for the arrangement of Fig. 4.

The invention may be applied to rectangular cylindrical cavity resonators as shown in Fig. 6, wherein cavity resonators 50 and 52 have elongated slots 54, that in the wall of resonator 50 being visible. The wall currents in the resonators 50 and 52 are normal to each other at the slots. Slits 56 have their lengths parallel to the current flow and are located at the ends of slot 54 in the wall of resonator 50. Slits 56 are joined respectively to slits 60 in the wall of resonator 52 by a twisted narrow tubular passageway. The walls may be slightly spaced to provide room for the twisted passageway.

In view of the foregoing, it will be apparent that the invention provides a coupling especially useful in the transfer of high frequency energy, and especially well adapted for coupling resonators excited in the $TM_{010}$ mode and other modes having zero electric field vectors at selected wall portions.

What is claimed is:

1. In combination, two waveguiding structures each having walls including a curved wall enclosing a waveguiding space and with said curved walls tangential at a common wall portion at substantially a single point only of tangency, said structures having a mode of excitation at an operating frequency with non-parallel directions of wall current flow at said common wall portion, each said structure having an elongated slot in its walls which slot passes through said common wall portion and has a central longitudinal line coplanar with the like line of the other said slot, the direction of said line being inclined at an angle between 0° and 90° to the direction of said current flow in at least one of said structures, and a hollow passageway extending between said structures and enclosing said slots for coupling wave energy in said spaces.

2. In combination, a pair of cavity resonators each having walls including a curved cylindrical wall defining a resonant space and with said cylindrical walls tangential at a common wall portion at substantially a single point only of tangency, the line elements of the cylindrical walls being non-parallel at said wall portions each said resonator having a mode of resonant excitation of said space at an operating frequency with the direction of current flow at said common wall portion in one resonator inclined to the direction of that in the other, and with substantially zero electric field vectors at said wall portion, each said resonator having an elongated slot in its walls which slot passes through said common wall portion and is in the same plane as the other said slot, the direction of length of said slots being inclined at an angle between 0° and 90° to said direction of said current flow at said slot in each of said resonators, and a coupling between said resonators including metallic walls defining a passageway terminating in said slots and affording communication between said resonant spaces.

3. The combination claimed in claim 2, the interior wall surfaces of said passageway being cylindrical with a line directrix normal to the plane of tangency.

4. The combination claimed in claim 3, said resonators each being circularly cylindrical, and the said modes of excitation each being the $TM_{010}$ mode.

5. The combination claimed in claim 2, said resonators each being circularly cylindrical, the said modes of excitation each being the $TM_{010}$ mode, and the axes of said resonators being inclined at right angles.

6. The combination claimed in claim 2, said resonators each being circularly cylindrical, the said modes of excitation each being the $TM_{010}$ mode, and the axes of said resonators being inclined at an angle excluding zero and ninety degrees.

7. In combination, a main cavity resonator and a plurality of auxiliary cavity resonators, each said resonator having walls defining a resonant space, said auxiliary resonators each being tangential at substantially a single point only of tangency at a common wall portion different from that of the others to said main resonator, each said resonator having a mode of excitation at an operating frequency with the direction of current flow at each said common wall portion in each auxiliary resonator inclined to that of said main resonator at the same said wall portion and with substantially zero electric field vectors at said wall portion in both of each said auxiliary and said main resonator, each said common wall portion having an elongated slot affording communication between the auxiliary and main resonators for electromagnetic energy and the length of which is inclined at an angle between 0° and 90° to said direction of current flow at said slot in each of said resonators and couplings one respectively between each said auxiliary and said main resonators, each said coupling including the slot at the said wall portion in common between them.

8. The combination claimed in claim 7, said resonators each being circularly cylindrical, said auxiliary resonators being circumferentially arranged around said main resonator.

9. The combination claimed in claim 7, said resonators each being circularly cylindrical, said auxiliary resonators being disposed in a line parallel to the axis of said main resonator.

10. The combination claimed in claim 2, said resonators being right circular cylindrical cavity resonators.

11. In combination, two waveguiding structures having walls enclosing a waveguiding space, the wall of each having a point of closest approach to that of the other, said structures each having a mode of excitation at an operating frequency with non-parallel directions of wall current flow at the wall portions at said points, each said structure having an elongated slot in its walls through the wall portion at said point and said slots each having a central longitudinal line coplanar with that of the other, the direction of length of a slot of at least one structure being inclined at an angle to the direction of said current flow in said one of said structures, and a coupling between said structures including said slots, each said wall portion having a pair of elongated parallel slits with their length in the direction of current flow one respectively at each end of said slot to form with said slot a figure H opening in said wall portion at least one of which openings is distorted with the cross-bar corresponding to said slot at an angle other than 90° with the legs of the H, said legs corresponding to the slits.

12. In combination, a pair of cavity resonators each having walls defining a resonant space and tangential at a common wall portion, each said resonator having a mode of resonant excitation of said space at an operating frequency with the direction of current flow at said common wall portion in one resonator inclined to the direction of that of the other, each said resonator having an elongated slot in its walls which slot passes through said common wall portion in the same plane as the other said slot, the direction of length of said slots being inclined at an angle to said direction of current flow at said slot in at least one of said resonators, and a coupling between said resonators including said slots, each said resonator having a pair of elongated slits in its walls one at each end of and transversely of said slot, thereby forming with the slot in each wall an H, said slits each being joined by a narrow metallic passageway to the corresponding and adjacent slit in the other resonator wall.

13. The combination claimed in claim 10, said resonators each being circularly cylindrical, said auxiliary resonators being circumferentially arranged around said main resonator, further comprising a plurality of high frequency generators connected one respectively to each of said auxiliary resonators to generate high frequency fields therein substantially at said operating frequency in said mode.

14. The combination claimed in claim 11, each said waveguiding structures being tangential at said wall portions.

15. The combination claimed in claim 11, the said coupling including a first passageway through which said slots communicate and a further pair of passageways each respectively affording communications between two adjacent said slits of different walls, each of said further passageways being in communication with said first passageway.

16. The combination claimed in claim 15, said structure being sections of rectangular waveguide with said wall portions closely spaced to be substantially in common over an area.

17. The combination claimed in claim 11, said structures being sections of rectangular waveguide.

18. A waveguide structure having walls, said srtucture having a mode of excitation at an operating frequency with a particular direction of current flow at a specified wall portion, a coupling slot in said wall portion having the direction of slot length inclined at an angle to the direction of said current flow, a pair of elongated parallel slits with their length in the direction of current flow one respectively at each end of said slot to form with said slot a figure H opening in said wall portion distorted with the H cross-bar corresponding to said slot at an angle other than 90° with the legs of the H, said legs corresponding to the slits.

19. The structure claimed in claim 18, said wall portion being curved.

20. The structure claimed in claim 18, said wall portion being planar.

21. The structure claimed in claim 11, said structures at said wall portions being curved and tangential.

22. The structure claimed in claim 11, said wall portions being planar and tangential.

23. The combination claimed in claim 11, the said coupling including a first passageway through which said slots communicate and a further pair of passageways each respectively affording communication between two adjacent said slits of different walls each of said further passageways being in communication with said first passageway, said wall portions being curved.

24. The combination claimed in claim 23, said wall portions being tangential at said points.

25. The combination claimed in claim 11, the said coupling including a first passageway through which said slots communicate and a further pair of passageways each respectively affording communication between two adjacent said slits of different walls, the said adjacent slits being inclined at an angle to each other and the said further pair of passageways each being twisted, each of said further passageways being in communication with said first passageway.

26. A wave transmission structure comprising, in combination, a pair of circular waveguide structures arranged at an angle with respect to each other and substantially tangent to one another at a given wall portion, each said structure being formed with an elongated slot at said given wall portion, the long dimension of at least one of said slots being at an angle between zero and 90° to the direction of current flow through the waveguide structure in which it is formed; and a coupling structure comprising a hollow, wave transmission device extending between said two waveguide structures and enclosing said slots, said hollow device and slots providing a given amount of coupling between said waveguide structures, said amount of coupling being functions of the angles between the direction of current flow in said waveguide structures and said slots.

27. A waveguide transmission structure as set forth in claim 26 wherein said elongated slots are of the same size, and the internal cross-sectional configuration of said coupling structure is substantially the same as the configuration of said slots.

28. A wave transmission structure as set forth in claim 27, wherein said waveguide structures comprise cavity resonators.

29. A cavity resonator system comprising, in combination, a main cavity resonator; a plurality of auxiliary cavity resonators, each tangent to said main cavity resonator at different wall portions of said main cavity resonator, each said auxiliary cavity resonator being formed with an elongated slot in its wall in the region thereof tangent to said main cavity resonator, and said main cavity resonator being formed with a plurality of corresponding elongated slots adjacent the slots in said auxiliary cavity resonators, said slots in said auxiliary cavity resonators each being at an angle with respect to the direction of current flow along the wall portion in which it is located, and said slots in said main cavity resonator also being inclined at an angle with respect to the direction of current flow through said main cavity resonator; and a plurality of hollow coupling structures joining said auxiliary cavity resonators to said main cavity resonator, each coupling structure enclosing a slot in an auxiliary cavity resonator and the corresponding slot in said main cavity resonator.

30. A cavity system comprising, in combination, a main cavity resonator; a plurality of auxiliary cavity resonators, each tangent to said main cavity resonator at different wall portions of said main cavity resonator, each said auxiliary cavity resonator being formed with an H-shaped cut-out portion in its wall in the region thereof tangent to said main cavity resonator, and said main cavity resonator being formed with a plurality of corresponding H-shaped cut-out portions adjacent the H-shaped cut-out portions in said auxiliary cavity resonators; and a plurality of hollow coupling structures joining said auxiliary cavity resonators to said main cavity resonator, each coupling structure including an H-shaped cut-out portion in an auxiliary cavity resonator and the corresponding H-shaped cut-out portion in said main cavity resonator.

31. The combination claimed in claim 8, said coupling structures comprising hollow passageways extending between said auxiliary cavity resonators and said main cavity resonator and enclosing corresponding H-shaped cut-out portions in said auxiliary and main resonators.

32. A cavity resonator structure comprising a main cavity resonator, a plurality of auxiliary cavity resonators, each said resonator having walls defining a resonant space, said auxiliary resonators being tangential at substantially a single point only of tangency at a common wall portion different from that of the others to said main resonator, each said resonator having a mode of excitation at an operating frequency with the direction of current flow at each common wall portion in each auxiliary resonator inclined to that of the main resonator at the same said wall portion and with substantially zero electric field vectors at said wall portion in both of each said auxiliary and main resonators, each said common wall portion being formed with H-shaped cut-out portions affording communication between the auxiliary and main resonators, and waveguide coupling means extending between each cut-out portion in said main resonator and the corresponding cut-out portion in an auxiliary cavity resonator for coupling electromagnetic energy from said auxiliary cavity resonators to said main cavity resonator or from said main cavity resonator to said auxiliary cavity resonators.

References Cited in the file of this patent

UNITED STATES PATENTS

| | | |
|---|---|---|
| 2,396,044 | Fox | Mar. 5, 1946 |
| 2,473,274 | Bradley | June 14, 1949 |
| 2,522,861 | Cork | Sept. 19, 1950 |
| 2,555,443 | Harvey | June 5, 1951 |
| 2,573,746 | Watson et al. | Nov. 6, 1951 |

OTHER REFERENCES

Ragan: Microwave Transmission Circuits, vol. 9 Radiation Laboratory Series Pub. 1948 McGraw Hill Co. pp. 358 and 374 relied on. (Copy in Div. 69.)